United States Patent
Balslink et al.

(10) Patent No.: US 9,945,669 B2
(45) Date of Patent: Apr. 17, 2018

(54) ROTATION RATE SENSOR AND A METHOD FOR OPERATING A ROTATION RATE SENSOR

(71) Applicant: Robert Bosch GmbH, Stuttgart (DE)

(72) Inventors: Thorsten Balslink, Kirchentellinsfurt (DE); Rolf Scheben, Reutlingen (DE); Benjamin Schmidt, Stuttgart (DE); Ralf Ameling, Aalen (DE); Mirko Hattass, Stuttgart (DE); Burkhard Kuhlmann, Reutlingen (DE); Robert Maul, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 226 days.

(21) Appl. No.: 14/890,559

(22) PCT Filed: May 5, 2014

(86) PCT No.: PCT/EP2014/059064
§ 371 (c)(1),
(2) Date: Nov. 11, 2015

(87) PCT Pub. No.: WO2014/184026
PCT Pub. Date: Nov. 20, 2014

(65) Prior Publication Data
US 2016/0084653 A1    Mar. 24, 2016

(30) Foreign Application Priority Data
May 14, 2013 (DE) .................. 10 2013 208 828

(51) Int. Cl.
*G01C 19/00* (2013.01)
*G01P 3/44* (2006.01)
(Continued)

(52) U.S. Cl.
CPC .................. *G01C 19/5712* (2013.01)

(58) Field of Classification Search
CPC .................................. G01C 19/5712
(Continued)

(56) References Cited

U.S. PATENT DOCUMENTS

| 7,222,533 B2 * | 5/2007 | Mao et al. ......... | G01C 19/5719 73/504.04 |
| 8,490,483 B2 | 7/2013 | Wrede et al. | |

(Continued)

FOREIGN PATENT DOCUMENTS

| DE | 102009027897 A1 | 1/2011 |
| DE | 102010062095 A1 | 5/2012 |
| EP | 2 527 789 A1 | 11/2012 |

OTHER PUBLICATIONS

International Search Report for PCT/EP2014/059064, dated Aug. 12, 2014. 2 pages.

*Primary Examiner* — Lisa Caputo
*Assistant Examiner* — Roger Hernandez-Prewitt
(74) *Attorney, Agent, or Firm* — Norton Rose Fulbright US LLP; Gerard Messina (57) ABSTRACT

A rotation rate sensor for detecting a rotational movement of the rotation rate sensor about a rotational axis extending within a drive plane of the rotation rate sensor include: a first rotational element, a second rotational element and a drive structure moveable in parallel to the drive plane, the first rotational element being drivable about a first center of rotation to achieve a first rotational vibration in parallel to the drive plane, the second rotational element being drivable about a second center of rotation to achieve a second rotational vibration in parallel to the drive plane, the drive structure being (i) coupled to the first and second rotational elements, and (ii) configured to generate a drive mode in
(Continued)

phase opposition of the first and second rotational vibrations.

9 Claims, 4 Drawing Sheets (51) Int. Cl.
    *G01P 9/00*     (2012.01)
    *G01P 15/08*     (2006.01)
    *G01C 19/5712*     (2012.01)

(58) Field of Classification Search
    USPC ................................ 73/504.12; 74/5.7, 5.37
    See application file for complete search history.

(56) References Cited

U.S. PATENT DOCUMENTS

| | | |
|---|---|---|
| 8,783,105 B2 | 7/2014 | Kuhlmann et al. |
| 2013/0019680 A1* | 1/2013 | Kittilsland et al. ... G01C 19/5712 73/504.12 |

* cited by examiner

ROTATION RATE SENSOR AND A METHOD FOR OPERATING A ROTATION RATE SENSOR

BACKGROUND OF THE INVENTION

1. Field of the Invention

The present invention is directed to a rotation rate sensor.

2. Description of the Related Art

Rotation rate sensors of this type are generally known. For example, micromechanical rotation rate sensors are known which detect a rotation rate of the rotation rate sensor. Rotation rate sensors of this type are commonly made of two oscillation-capable masses, which are also referred to as Coriolis elements or partial oscillators. The partial oscillators are, for example, driven to achieve an antiparallel or a drive mode in phase opposition, antiparallel or detection vibrations in phase opposition of the partial oscillators being excited by Coriolis forces in the case of a rotation rate sensor acted upon by a rotation rate. The detection vibrations of the partial oscillators are capacitively detected and a rotation rate signal is generated with the aid of evaluation electronics. The drive vibration or detection vibration of the partial oscillators of rotation rate sensors of this type may, for example, be a linear vibration or a rotational vibration, the partial oscillators also being referred to as rotational elements in the case of a rotational vibration.

However, known rotation rate sensors of this type have, besides the antiparallel or drive modes and/or detection modes in phase opposition, additionally a comparatively large number of fault modes which may interfere with the detection of rotation rate signals.

Furthermore, the known rotation rate sensors have a comparatively large number of micromechanical components, which complicates the manufacture of micromechanical rotation rate sensors of this type, in particular of multichannel rotation rate sensors, and makes them expensive.

BRIEF SUMMARY OF THE INVENTION

It is therefore the object of the present invention to provide a rotation rate sensor and a method for operating a rotation rate sensor which do not have the disadvantages of the related art and are not sensitive to interference accelerations, have few fault modes, and whose manufacture is simplified.

The rotation rate sensor according to the present invention and the method according to the present invention for operating a rotation rate sensor have the advantage over the related art that by coupling the drive structure to the first rotational element and to the second rotational element, a drive mode in phase opposition of the first rotational vibration and of the second rotational vibration is generated, the number of fault modes being reduced by a coupling of the rotational elements of this type. In particular, it is advantageously possible to provide only one single drive structure for a rotatory rotation rate sensor so that the sensor structure and its manufacture are simplified. In particular, the rotation rate sensor includes a substrate with a main extension plane in parallel to the drive plane, a rotational axis of a rotation rate to be detected being situated in parallel to the main extension plane or the drive plane. The direction in parallel to the rotational axis of the rotation rate to be detected is also designated as a first direction or Y direction. The two rotational elements are each configured particularly preferably as disk-shaped and/or mass symmetrical to one another. Furthermore, a first detection vibration of the first rotational element is detected with the aid of a detection device, for example capacitively, as a deviation from the first rotational vibration and a second detection vibration of the second rotational element as a deviation from the second rotational vibration. The first rotational element and the second rotational element are situated preferably moveably in a detection direction perpendicular to the drive plane or the main extension plane, a detection mode of the first and second detection vibrations being in particular in phase opposition. In particular, the first and second rotational elements each have two degrees of freedom, in particular a first degree of freedom of a drive vibration about a third direction perpendicular to the drive plane, which is also designated as the Z direction, and a second degree of freedom of a detection vibration about a second direction in parallel to the drive plane and perpendicular to the rotational axis, which is also designated as the X direction. The first rotational vibration and the second rotational vibration are here also designated collectively as rotational vibration or drive vibration. In particular, the first detection vibration and the second detection are also designated collectively as detection vibration. The first rotational element and the second rotational element are preferably coupled to the drive structure in such a way that essentially only the drive vibrations and the detection vibrations are drivable.

According to one preferred refinement, the drive structure is situated linearly moveably along a drive direction, the drive structure being designed in particular as a drive frame completely or at least partially surrounding the first rotational element and the second rotational element, the drive structure being coupled in particular to the first rotational element and to the second rotational element in such a way that the first rotational element and the second rotational element are driven in the opposite direction with respect to one another with the aid of a linear movement of the drive structure along the drive direction. Hereby, it is advantageously possible to drive the first rotational element and the second rotational element with respect to rotational vibrations or drive vibrations in the opposite direction with the aid of one, in particular one single, drive frame, so that in particular an additional drive structure may be omitted. By coupling the first rotational element and the second rotational element with the aid of the drive structure, comparatively many fault modes are advantageously suppressed. In particular, the first rotational element and the second rotational element are coupled to the drive structure at diametrically opposed ends, in particular in a border area.

According to one preferred refinement, the first rotational element is coupled to a first anchor element of the substrate, in particular via a first restoring element, and the second rotational element is coupled to a second anchor element of the substrate, in particular via a second restoring element, the drive structure being coupled to the first rotational element via a first coupling element and the drive structure being coupled to the second rotational element via a second coupling element, in particular the first rotational element having a first recess completely or partially surrounding the first anchor element in the area of the first center of rotation, in particular the second rotational element having a second recess completely or partially surrounding the second anchor element in the area of the second center of rotation. Hereby, it is advantageously possible to generate the rotational vibration of the rotational elements by a linear drive movement of the drive structure. This is achieved in particular in that, in a rest position or equilibrium position of the rotational element, the first coupling element and the first anchor element, and in particular the first restoring element, are situated along one direction, in particular an X or second direction, perpendicular to the rotational axis of the rotation rate sensor. A connecting point of the first coupling element on the first rotational element is displaced, relative to an additional connecting point of the anchor element on the first rotational element, in parallel to the rotational axis, in particular in the first (Y) direction, by a linear vibration of the drive structure. Thereby, the first rotational vibration is generated. The same applies correspondingly for the second rotational element, all listed components being situated along a common straight line.

According to one preferred refinement, the first rotational element and the second rotational element are coupled to one another via a rocker structure, the rocker structure having in particular a rocker rotational axis, the rocker rotational axis being situated in particular in parallel to the rotational axis. Hereby, it is advantageously possible to suppress additional fault modes. A cophasal detection mode is suppressed particularly advantageously by the coupling of the first rotational element and the second rotational element via the rocker structure. Furthermore, the interfering cophasal detection modes are shifted to higher frequencies by the rocker structure.

According to one preferred refinement, the first rotational element and the second rotational element are coupled to one another via only one substrate of the rotation rate sensor, the drive structure, and/or the rocker structure. Hereby, it is advantageously possible to couple the drive movement or drive vibration—i.e., the first rotational vibration and the second rotational vibration—of the first and second rotational elements to one another via only the drive structure or the external drive frame. Hereby, the number of springs and thus the number of fault modes is reduced compared to the related art. Furthermore, a cophasal detection mode is suppressed by the coupling of the first rotational element and the second rotational element via the rocker structure. Furthermore, the interfering cophasal detection modes are shifted to higher frequencies by the rocker structure.

According to one preferred refinement, the drive direction of the drive structure is situated in parallel to the rotational axis, or the drive direction includes a crown angle to the rotational axis, the crown angle in particular being preferably between 0 degrees and 90 degrees starting from the rotational axis in the direction of the drive direction, particularly preferably being between 30 degrees and 60 degrees, more particularly preferably being 45 degrees. By setting the crown angle to 45 degrees, it is advantageously possible to detect two rotation rates about two rotational axes orthogonal to one another with the aid of two rotation rate sensors situated in particular on a shared substrate, and simultaneously to drive all rotational elements of the two rotation rate sensors with one single drive structure. Furthermore, it is advantageously possible to couple the drive structure to the first rotational element via a first deflection means and to respectively couple the second rotational element to the drive structure via a second deflection means. The first deflection means and the second deflection means are configured in particular to deflect a drive force originating from the drive structure along the drive direction in such a way that the two rotational elements each implement the rotational vibration or drive vibration in the described way.

Another subject matter of the present invention relates to a rotation rate sensor system including at least two rotation rate sensors, the rotation rate sensor system being configured for detecting at least two rotation rates about at least two different rotational axes, each rotation rate sensor of the at least two rotation rate sensors each having a drive structure, the drive structures of the at least two rotation rate sensors being coupled, in particularly rigidly, to one another. Hereby, it is advantageously possible to detect multiple rotational axes, in particular to provide one rotation rate sensor system with a detection sensitivity with respect to one, two, or three rotational axes and simultaneously to provide multiple drive structures coupled to one another using one single drive structure or with the aid of one single drive movement. Due to the coupling of the drive structures or by the provision of one single drive structure, a simplified rotation rate sensor system is provided and the number of springs and thus the number and size of the fault modes are reduced. According to one alternative specific embodiment, the drive structures of the two rotation rate sensors are situated to be drivable to achieve a drive vibration in phase opposition.

According to one preferred refinement of the method according to the present invention, the drive structure is moved linearly along a drive direction to generate the drive mode in phase opposition of the first rotational vibration and the second rotational vibration. Hereby, it is possible to generate the rotational vibration or drive vibration of each rotational element by coupling the drive structure to the first rotational element and to the second rotational element. Hereby, coupling springs are omitted and simultaneously the number of fault modes is reduced.

According to one preferred refinement, a recess for anchoring to a substrate of the rotation rate sensor is situated on the first rotational element in the area of the first center of rotation, a recess for anchoring to a substrate of the rotation rate sensor being situated on the second rotational element in the area of the second center of rotation. Hereby, it is advantageously possible to provide rotational elements anchored to the substrate in each center of rotation so that in particular a drive vibration in phase opposition of the rotational elements is drivable. Simultaneously, springs may be hereby omitted and fault modes may be suppressed.

According to one preferred refinement, the first rotational element and the second rotational element are coupled to one another via a rocker structure, a rocker rotational axis of the rocker structure being situated in parallel to the rotational axis, a detection mode in phase opposition of a first detection vibration of the first rotational element and a second detection vibration of the second rotational element being generated with the aid of the rocker structure. Hereby, it is advantageously possible to suppress additional fault modes. Particularly advantageously, a cophasal detection mode is suppressed by the coupling of the first rotational element and the second rotational element via the rocker structure. Furthermore, the interfering cophasal detection modes are shifted to higher frequencies by the rocker structure.

According to one preferred refinement, the first rotational element and the second rotational element are coupled to one another via only one substrate of the rotation rate sensor, the drive structure, and/or the rocker structure. Hereby, it is advantageously possible to couple the drive movement or drive vibration,—i.e., the first rotational vibration and the second rotational vibration—of the first and second rotational elements to one another via only the drive structure or the external drive frame. Hereby, the number of springs and thus the number of fault modes is reduced compared to the related art. Furthermore, a cophasal detection mode is suppressed by coupling the first rotational element and the second rotational element via the rocker structure.

Furthermore, the interfering cophasal detection modes are shifted to higher frequencies by the rocker structure.

Exemplary embodiments of the present invention are represented in the drawings and explained in greater detail in the subsequent description.

DETAILED DESCRIPTION OF THE INVENTION

In the different figures, the same parts are always provided with the same reference numerals and are therefore generally also only cited or mentioned once respectively.

Figure 1:
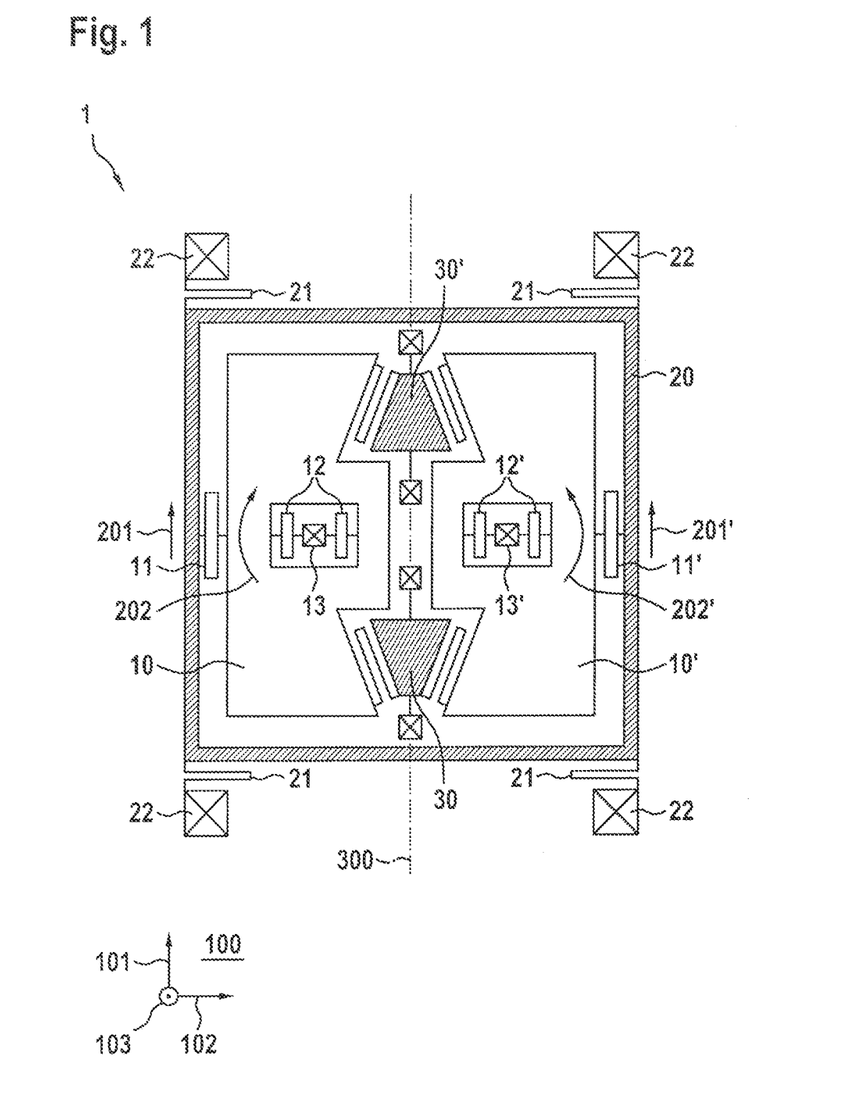
FIGS. 1 through 4 schematically show specific embodiments of the rotation rate sensor according to the present invention.

FIG. 1 schematically shows by way of example one specific embodiment of rotation rate sensor 1 according to the present invention. Rotation rate sensor 1 is configured for detecting a rotational movement of rotation rate sensor 1 about a rotational axis 300, rotational axis 300 extending within a drive plane 100 of rotation rate sensor 1. In particular, the rotation rate sensor has a substrate with a main extension plane 100 situated in parallel to the drive plane 100.

Rotation rate sensor 1 has a first rotational element 10, a second rotational element 10', and a drive structure 20 which is movable in parallel to drive plane 100.

First rotational element 10 is drivable about a first center of rotation 13 to achieve a first rotational vibration in parallel to drive plane 100 and second rotational element 10' is drivable about a second center of rotation 13' to achieve a second rotational vibration in parallel to drive plane 100. The first rotational vibration is preferably a rotational movement of first rotational element 10 about a first rotational axis extending perpendicularly to drive plane 100, which runs through first center of rotation 13. In particular, a second rotational axis correspondingly runs in parallel to the first rotational axis through second center of rotation 13' of second rotational element 10'. In particular, first center of rotation 13 is connected and/or anchored to the substrate of rotation rate sensor 1 in the area of first center of rotation 13 in such a way that first rotational element 10 is drivable to achieve the first rotational vibration about the first rotational axis. In particular, second rotational element 10' is connected and/or anchored to the substrate in the area of second center of rotation 13' and is drivable about the second rotational axis. The two rotational elements 10, 10' are each formed here as disk-shaped and each has in the areas of their centers of rotation, which are in particular the respective centers of mass, a first and second recess respectively. An anchor element, i.e., at center of rotation 13 stationarily coupled to the substrate is situated here in a first recess of first rotational element 10; this anchor element is elastically coupled to first rotational element 10 via at least one restoring element 12, in particular via two restoring elements 12 on diametrically opposed sides of anchor element, i.e., at center of rotation 13. In particular, two restoring elements 12 are each designed as coupling springs. Second rotational element 10' is designed and/or is situated on the substrate identically to first rotational element 10 with respect to form and mass distribution, and mirror-symmetrically with respect to rotational axis 300.

Drive structure 20 is preferably a drive frame 20 which is linearly moveable along a drive direction 201 and completely or at least partially surrounds first rotational element 10 and second rotational element 10'. Drive frame 20 is configured here as a rectangular drive frame 20 extending essentially in parallel to drive plane 100 and surrounding two rotational elements 10, 10'. In one alternative specific embodiment, drive frame 20 is designed as a square. The drive structure is preferably connected and/or coupled at a first connecting point to first rotational element 10 via a first coupling element 11 and/or at a second coupling point to second rotational element 10' via a second coupling element 11'. The two connecting points are situated here along a direction perpendicular to rotational axis 300 at diametrically opposed ends of two rotational elements 10, 10'. In particular, first and second coupling elements 11, 11' are each designed as elastic spring elements. Drive structure 20 is coupled here via restoring elements 21 to anchor elements 22 of the substrate of the rotation rate sensor so that drive structure 20 is drivable along a drive direction 201 to achieve a linear vibration. Drive structure 20 is, for example, electrostatically driven with the aid of interdigital structures—in parallel here to Y direction 101—and is connected to the substrate for example via anchor elements 22.

A straight line drive vibration of drive structure 20, designated as linear vibration, is transmitted to two rotational elements 10, 10' via first coupling element 11 and second coupling element 11'. Since two rotational elements 10, 10' are coupled along an X direction 102 perpendicular to rotational axis 300 on diametrically opposed sides or to external linkage points to drive structure 20, and at the same time linked to the substrate at a point lying further inward, which is in particular respective center of rotation 13 and 13', with the aid of restoring elements 12 and 12' via anchor elements 13 and 13'. The two rotational elements carry out a rotatory drive movement in phase opposition. The first or second rotational axis of the drive vibrations or rotational vibrations of each rotational element 10, 10' runs thereby in parallel to the Z direction. The drive vibrations and rotational vibrations are represented here by arrows 201, 201'.

If drive structure 20 is driven along drive direction 201 with the aid of a drive device 23, 23', 23" (represented by way of example in FIG. 4) to achieve linear vibration, then first rotational element 10 and second rotational element 10', due to the coupling to drive structure 20, are also moved in such a way that two rotational elements 10, 10' respectively carry out the first and second rotational vibrations about the first and the second centers of rotation 13, 13'. Thereby, a drive mode in phase opposition of the first rotational vibration and the second rotational vibration is generated by a linear vibration of drive structure 20 along drive direction 201. In particular, the first rotational vibration and the second rotational vibration are a first drive vibration and a second drive vibration situated in parallel to drive plane 100. During a movement of drive structure 20 in drive direction 201, represented by arrow 201, first rotational element 10 carries out a first rotational movement about center of rotation 13 in the drive mode in phase opposition, the first rotational movement being a drive movement 202, represented by arrow 202. Likewise, second rotational element 10' carries out a second rotational movement about second center of rotation 13', the second rotational movement being a drive movement 202', represented by arrow 202', and being in the opposite direction to first rotational movement 202. Due to a movement of drive structure 20 in drive direction 201 in a Y direction 101, a front end piece of first rotational element 10, situated in Y direction 101, is moved from center of rotation 13 in an X direction 102, and a back end piece of first rotational element 10, situated diametrically opposed along Y direction 101, is moved oppositely to X direction 102. Drive plane 100 is spanned in this case by X direction 102 and Y direction 101, rotational axis 300 being situated here perpendicularly to X direction 102. If a rotation rate about rotational axis 300 is applied to rotation rate sensor 1 in Y direction 101—i.e., a rotation rate of rotation rate sensor 1 in Y direction 101 in the clockwise direction—the drive vibrations in phase opposition of first and second rotational elements 10, 10' effectuate, for example, a deflection of the first rotational element in a Z direction perpendicular to drive plane 100. In particular, in the case of the drive mode represented by arrows 202 and 202', the front end of first rotational element 10 is deflected upwards—i.e., in the Z direction—and a deflection of the back end downward—i.e., in the direction diametrically opposed to the Z direction. Due to the first drive vibration of first rotational element 10, a first detection vibration of first rotational element 10 is generated here about a third rotational axis in parallel to X direction 102. Correspondingly, second rotational element 10' is driven to achieve a second detection vibration in the opposite direction to the first detection vibration. If a rotation rate is present about Y direction 101, then this results during a movement of a mass, in particular of a rotational element 10, 10', in positive X direction 102—i.e., in the plane of the drawing to the right—in a Coriolis force in positive Z direction 103—i.e., out of the plane of the drawing. In contrast, a mass, in particular of rotational element 10, 10', which moves in negative X direction 102, experiences a Coriolis force in negative Z direction 103. In the case of the first and second rotational movements of rotational elements 10, 10', this results, in the presence of a rotation rate about Y direction 102, in a deflection of one side of rotational element 10, 10' upwardly, i.e., in positive Z direction 103—and to a deflection of another side of rotational element 10, 10' downwardly—i.e., in the negative Z direction. A movement of this type is designated in particular as a detection movement, the detection movement being another first or second rotational vibration about a detection axis in parallel to X direction 102. The position of the detection axis and/or the first rotational axis of first rotational element 10 is determined by the position of anchor element 13 relative to the substrate. The same applies accordingly to second rotational element 10'.

Furthermore, rotation rate sensor 1 has in particular a rocker structure 30 and another rocker structure 30', the rocker structures being configured in such a way that cophasal detection modes of the first detection vibration and the second detection vibration are suppressed. For example, cophasal detection modes of this type of the first and second detection vibration may be excited by interference vibrations of rotation rate sensor 1.

Figure 2:
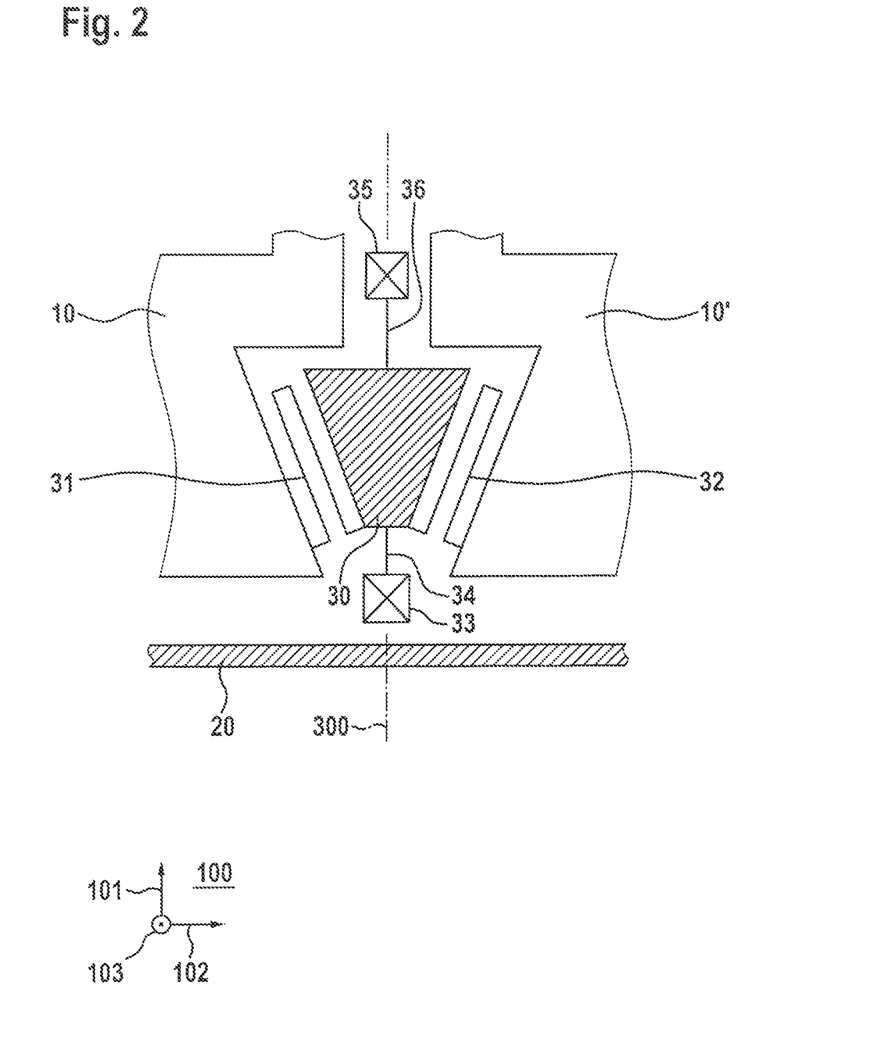

FIG. 2 schematically shows by way of example a rocker structure of one specific embodiment of rotation rate sensor 1 according to the present invention. The first rotational element and the second rotational element are coupled to one another via a rocker structure 30 and an additional rocker structure 30'. Rocker structures 30 and 30' are composed in particular of a mass, rocker structure 30 and additional rocker structure 30' having in particular a rocker rotational axis and an additional rocker rotational axis respectively. The rocker rotational axis and the additional rocker rotational axis are preferably situated one behind the other along rotational axis 300. Rocker structure 30 is represented here as a trapezoidal shape. Furthermore, rocker structure 30 is connected on one side along the rocker rotational axis via a torsion element 34 or a twisted bar 34 to an anchor element 33 of the substrate. On another side along the rocker rotational axis diametrically opposed to the one side, rocker structure 30 is coupled via an additional torsion element 36 or an additional twisted bar 36 to an additional anchor element 35 of the substrate. Furthermore, rocker structure 30 is here coupled via a first rocker coupling element 31, in particular a U-spring 31, to first rotational element 10 and via a second rocker coupling element 32, in particular an additional U-spring 32, to second rotational element 10'. A movement, for example, the detection vibration, of two rotational elements 10, 10' in parallel to Z direction 103 is coupled here by the coupling of rocker structure 30 to two rotational elements 10, 10'. This means, for example, that a movement of first rotational element 10 upwardly on the left side—i.e., in Z direction 102 or out of drawing plane 100—a movement of second rotational element 10' downwardly—i.e., counter to Z direction 102 or into drawing plane 100 is effectuated by rocker structure 30. Since two rotational elements 10, 10' vibrate in phase opposition in the drive movement, the detection movement is also in phase opposition. Coupling two rotational elements 10, 10' via, in this case two, rocker structures 30, 30' linked to the substrate, ensures that only these detection movements in phase opposition may be carried out. Rotational elements 10, 10' are thus in particular only coupled to one another via anchor elements 13, 13', and thus via the substrate, drive frame 20, and rocker structures 30, 30'. In particular, two rotational elements 10, 10' are not coupled directly to one another—i.e., not directly via merely one component, for example, a spring.

The first detection vibration of first rotational element 10 is preferably detected, in particular capacitively detected, and a first rotation rate signal is generated with the aid of evaluation electronics. Furthermore, the second detection vibration of second rotational element 10' is preferably detected, in particular capacitively detected, and a second rotation rate signal is generated with the aid of evaluation electronics. Subsequently, a difference signal is generated by the evaluation electronics from the two rotation rate signals. Hereby, it is advantageous to use the difference signal to filter out undesirable or interfering linear accelerations and/or rotation rate accelerations, which do not result in a movement in phase opposition of rotational elements 10, 10'.

Figure 3:
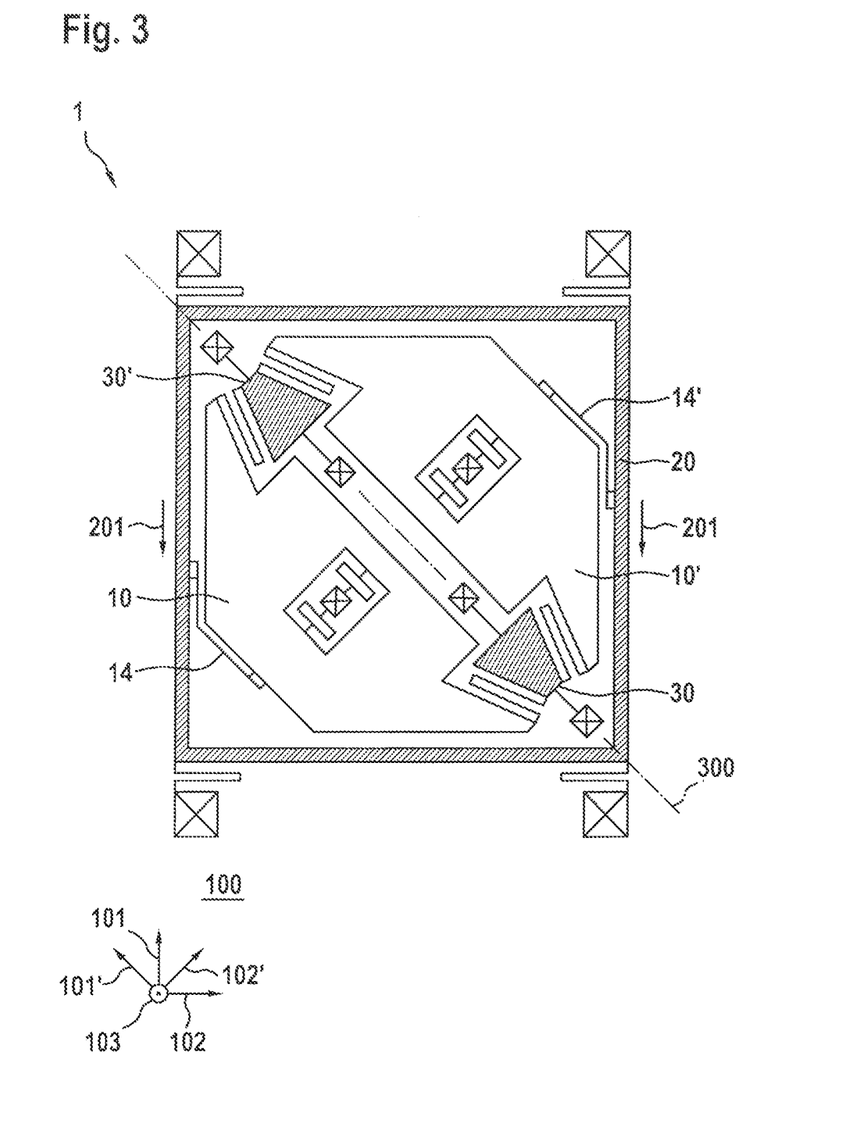

FIG. 3 schematically shows by way of example one specific embodiment of rotation rate sensor 1 according to the present invention. Rotational axis 300 of rotation rate sensor 1 is here not parallel to drive direction 201 of drive structure 20, but instead is situated at a crown angle, in particular at 45 degrees, to drive direction 201 of drive structure 20. A first drive force of drive structure 20 caused by the linear vibration is situated along drive direction 201 and is deflected via deflection means 14 and 14' to a second drive force in parallel to rotational axis 300. With the aid of the second drive force, two rotational elements 10, 10' are driven to achieve the first and second rotational vibrations, in particular in the opposite direction of one another. Thus, the rotation rate sensor according to the present invention including rotatory partial oscillators 10, 10' or rotational elements 10, 10' for detecting a first rotation rate about a Y' direction 101' situated at the crown angle to Y direction 101 within the drive plane 100 is able to be combined with a second rotation rate sensor 1" for detecting a second rotation rate about a second rotational axis 300" (see FIG. 4)—i.e., to provide a rotation rate sensor system which is configured for detecting multiple rotation rates around multiple rotational axes 300, 300".

Figure 4:
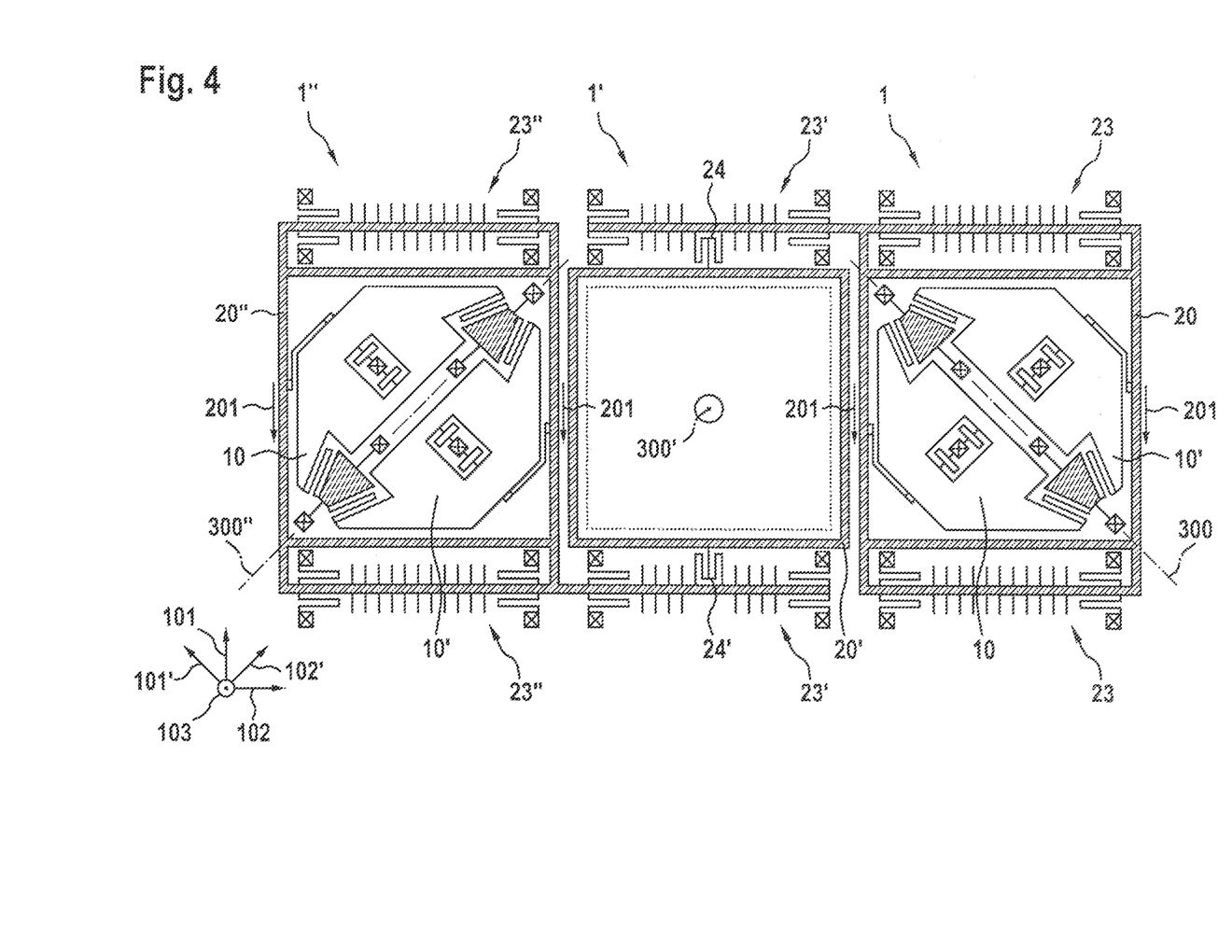

FIG. 4 schematically shows by way of example a rotation rate sensor system of one specific embodiment of rotation rate sensor 1 according to the present invention. A threechannel rotation rate sensor system is represented here, including a first rotation rate sensor 1, a second rotation rate sensor 1', and in particular a third rotation rate sensor 1". First rotation rate sensor 1 is configured for detecting a first rotation rate about a rotational axis 300 in parallel to additional first Y' direction 101', Y' direction 101' including a crown angle of 45 degrees starting from Y direction 101 in the counter-clockwise direction. Second rotation rate sensor 1" is configured for detecting a second rotation rate about a rotational axis 300" in parallel to additional second X' direction 102', X' direction 102' including a crown angle of 45 degrees starting from X direction 102 in the counter-clockwise direction. Third rotation rate sensor 1' is configured in particular for detecting a third rotation rate about a rotational axis 300' in parallel to Z direction 103. In particular, each rotation rate sensor 1, 1', 1" of the three rotation rate sensors 1, 1', 1" has a drive structure 20, 20', 20" respectively. In particular, drive structures 20, 20" of first rotation rate sensor 1 and second rotation rate sensor 1" are situated moveably and are drivable to carry out a drive movement or to achieve a linear vibration along the same drive direction 201, drive structure 20 of first rotation rate sensor 1 being coupled to drive structure 20" of second rotation rate sensor 1". In one alternative specific embodiment, drive structure 20 of first rotation rate sensor 1 is rigidly coupled to drive structure 20" of second rotation rate sensor 1" (not shown).

Alternatively, one single drive structure 20, 20' is situated for driving first and second rotation rate sensors 1, 1". The drive structures are driven here via drive devices 23, 23', 23" to achieve linear vibrations. Furthermore, drive structure 20' of third rotation rate sensor 1' is coupled here to drive structure 20 of first rotation rate sensor 1 with the aid of a transmission element 24 and to drive structure 20" of second rotation rate sensor 1" with the aid of an additional transmission element 24'.

What is claimed is:

1. A rotation rate sensor for detecting a rotational movement of the rotation rate sensor about a rotational axis extending within a drive plane of the rotation rate sensor, comprising:
   a first rotational element;
   a second rotational element; and
   a drive structure moveable in parallel to the drive plane;
   wherein the first rotational element is driven about a first center of rotation to achieve a first rotational vibration in parallel to the drive plane, the second rotational element is driven about a second center of rotation to achieve a second rotational vibration in parallel to the drive plane, the drive structure is coupled to the first rotational element and to the second rotational element, and the drive structure is configured to generate a drive mode in phase opposition of the first rotational vibration and the second rotational vibration; and
   wherein the drive structure is:
   (i) situated linearly moveably along a drive direction;
   (ii) configured as a drive frame at least partially surrounding the first rotational element and the second rotational element;
   (iii) coupled to the first rotational element and the second rotational element in such a way that the first rotational element and the second rotational element are driven in the opposite direction of one another with the aid of a linear movement of the drive structure along the drive direction.

2. A rotation rate sensor for detecting a rotational movement of the rotation rate sensor about a rotational axis extending within a drive plane of the rotation rate sensor, comprising:
   a first rotational element;
   a second rotational element; and
   a drive structure moveable in parallel to the drive plane;
   wherein the first rotational element is driven about a first center of rotation to achieve a first rotational vibration in parallel to the drive plane, the second rotational element is driven about a second center of rotation to achieve a second rotational vibration in parallel to the drive plane, the drive structure is coupled to the first rotational element and to the second rotational element, and the drive structure is configured to generate a drive mode in phase opposition of the first rotational vibration and the second rotational vibration; and
   wherein the first rotational element and the second rotational element are coupled to one another via a rocker structure having a rocker rotational axis situated in parallel to the rotational axis.

3. The rotation rate sensor as recited in claim 2, wherein the first rotational element and the second rotational element are coupled to one another via only one substrate of at least one of the rotation rate sensor, the drive structure, and the rocker structure.

4. The rotation rate sensor as recited in claim 2, wherein one of (i) the drive direction of the drive structure is situated in parallel to the rotational axis, or (ii) the drive direction includes a crown angle to the rotational axis, the crown angle being between 0 degree and 90 degrees starting from the rotational axis in the direction of the drive direction.

5. A rotation rate sensor system, comprising:
   at least two rotation rate sensors, wherein each of the two rotation rate sensors is configured for detecting a rotational movement of the rotation rate sensor about a rotational axis extending within a drive plane of the rotation rate sensor, and wherein each of the two rotation rate sensor includes:
   a first rotational element;
   a second rotational element; and
   a drive structure moveable in parallel to the drive plane;
   wherein the first rotational element is driven about a first center of rotation to achieve a first rotational vibration in parallel to the drive plane, the second rotational element is driven about a second center of rotation to achieve a second rotational vibration in parallel to the drive plane, the drive structure is coupled to the first rotational element and to the second rotational element, and the drive structure is configured to generate a drive mode in phase opposition of the first rotational vibration and the second rotational vibration;
   wherein the rotation rate sensor system is configured for detecting at least two rotation rates about at least two different rotational axes, and wherein the drive structures of the at least two rotation rate sensors are coupled to one another.

6. A method for operating a rotation rate sensor for detecting a rotational movement of the rotation rate sensor about a rotational axis, the rotational axis being situated within a drive plane of the rotation rate sensor, the method comprising:
   coupling a drive structure to a first rotational element and to a second rotational element; and
   moving the drive structure in parallel to the drive plane, wherein the first rotational element is driven about a first center of rotation to achieve a first rotational vibration in parallel to the drive plane, and the second rotational element is driven about a second center of rotation to achieve a second rotational vibration in parallel to the drive plane;

wherein a drive mode in phase opposition of the first rotational vibration and the second rotational vibration is generated with the aid of the drive structure; and wherein the drive structure is moved linearly along a drive direction to generate the drive mode in phase opposition of the first rotational vibration and the second rotational vibration.

7. The method as recited in claim 6, wherein a recess for anchoring to a substrate of the rotation rate sensor is situated on the first rotational element in the area of the first center of rotation, and a recess for anchoring to a substrate of the rotation rate sensor is situated on the second rotational element in the area of the second center of rotation.

8. The method as recited in claim 6, wherein the first rotational element and the second rotational element are coupled to one another via a rocker structure having a rocker rotational axis situated in parallel to the rotational axis, and wherein a detection mode in phase opposition of a first detection vibration of the first rotational element and a second detection vibration of the second rotational element is generated with the aid of the rocker structure.

9. The method as recited in claim 6, wherein the first rotational element and the second rotational element are coupled to one another via only one substrate of at least one of the rotation rate sensor, the drive structure, and the rocker structure.

* * * * *